United States Patent
Sun et al.

(10) Patent No.: US 11,696,588 B2
(45) Date of Patent: Jul. 11, 2023

(54) MOVABLE CONTROLLED ATMOSPHERE STORE FOR FRUITS AND VEGETABLES

(71) Applicant: GUANGXI ACADEMY OF AGRICULTURAL SCIENCES, Nanning (CN)

(72) Inventors: Jian Sun, Nanning (CN); Li Li, Nanning (CN); Jiemin Li, Nanning (CN); Changbao Li, Nanning (CN); Xuemei He, Nanning (CN); Ming Xin, Nanning (CN); Zhugui Zhou, Nanning (CN); Jinfeng Sheng, Nanning (CN); Fengjin Zheng, Nanning (CN); Zhichun Li, Nanning (CN); Zhanshi Xiao, Nanning (CN); Guoming Liu, Nanning (CN); Yayuan Tang, Nanning (CN); Ying Yang, Nanning (CN); Dongning Ling, Nanning (CN)

(73) Assignee: GUANGXI ACADEMY OF AGRICULTURAL SCIENCES, Nanning (CN)

( * ) Notice: Subject to any disclaimer, the term of this patent is extended or adjusted under 35 U.S.C. 154(b) by 499 days.

(21) Appl. No.: 17/043,141

(22) PCT Filed: Aug. 1, 2019

(86) PCT No.: PCT/CN2019/098891
§ 371 (c)(1),
(2) Date: Sep. 29, 2020

(87) PCT Pub. No.: WO2020/220494
PCT Pub. Date: Nov. 5, 2020

(65) Prior Publication Data
US 2021/0368814 A1    Dec. 2, 2021

(30) Foreign Application Priority Data

Apr. 30, 2019 (CN) .......................... 201910365394.3

(51) Int. Cl.
F25D 23/12 (2006.01)
A23B 7/055 (2006.01)
(Continued)

(52) U.S. Cl.
CPC .............. *A23B 7/055* (2013.01); *A23B 7/152* (2013.01); *F25D 17/042* (2013.01); *F25D 23/12* (2013.01);
(Continued)

(58) Field of Classification Search
CPC ....... A23B 7/055; A23B 7/152; F25D 11/003; F25D 17/042; F25D 2201/10;
(Continued)

(56) References Cited

U.S. PATENT DOCUMENTS 5,249,428 A * 10/1993 Barbe .................... A23B 7/148
426/418
5,457,963 A * 10/1995 Cahill-O'Brien ........ F24F 11/63
99/468
(Continued)

FOREIGN PATENT DOCUMENTS

CN    2295710 Y    10/1998
CN    1218172 A    6/1999
(Continued)

OTHER PUBLICATIONS

International Search Report and Written Opinion dated Jan. 8, 2020 in corresponding International application No. PCT/CN2019/098891; 11 pages.
(Continued)

*Primary Examiner* — Filip Zec
(74) *Attorney, Agent, or Firm* — Maier & Maier, PLLC

(57) ABSTRACT

A movable controlled atmosphere store for fruits and vegetables, including: a store body in rectangular container structure and successively provided with an equipment room
(Continued)

and a storage room along length direction; the equipment room is provided with an equipment door respectively on left and right sides; the storage room is in thermal insulation and sealing structure and provided with a sealing door at an end far away from the equipment room, and is provided with a sampling door on a side which is provided with a sealing film connected around a frame thereof, and a sampling assembly connected with the sealing film in cylindrical structure; a controlled atmosphere control system, including a control panel, as well as a refrigerator, a humidifier, a sterilizer, a nitrogen generator, a carbon dioxide adsorber, an ethylene adsorber, a temperature and humidity sensor and a gas concentration sensing device connected with the control panel.

9 Claims, 4 Drawing Sheets

(51) Int. Cl.
*A23B 7/152* (2006.01)
*F25D 17/04* (2006.01)

(52) U.S. Cl.
CPC .. *F25D 2201/10* (2013.01); *F25D 2317/0416* (2013.01); *F25D 2317/04131* (2013.01); *F25D 2700/06* (2013.01)

(58) Field of Classification Search
CPC ........... F25D 23/12; F25D 2317/04131; F25D 2317/0416; F25D 2700/06
See application file for complete search history.

(56) References Cited

U.S. PATENT DOCUMENTS

| | | | |
|---|---|---|---|
| 5,718,118 A | 2/1998 | Eisele | |
| 9,409,770 B2* | 8/2016 | Ginzburg | C01B 3/0021 |
| 9,468,220 B2* | 10/2016 | Bell | A23B 4/16 |
| 9,938,030 B2* | 4/2018 | Beniya | B65B 1/04 |
| 2003/0159595 A1* | 8/2003 | Kiefer | A23B 7/152 99/468 |
| 2012/0070334 A1* | 3/2012 | Ehrhorn | G01N 21/766 422/62 |
| 2015/0335038 A1* | 11/2015 | Biotti | A61L 9/015 422/119 |
| 2017/0042170 A1* | 2/2017 | Ehrhorn | F25D 11/003 |

FOREIGN PATENT DOCUMENTS

| | | |
|---|---|---|
| CN | 1263443 A | 8/2000 |
| CN | 2525449 Y | 12/2002 |
| CN | 201152946 Y | 11/2008 |
| CN | 203473557 U | 3/2014 |
| CN | 107082192 A | 8/2017 |
| CN | 109990525 A | 7/2019 |
| JP | H04158841 A | 6/1992 |

OTHER PUBLICATIONS

Office Action and Search Report dated Feb. 27, 2020 in corresponding Chinese application No. 201910365394.3; 8 pages.
Lu, et al., "Construction and Application of Flexible Controlled Atmosphere Storage", Shandong fruit Research Institute, 2005; 4 pages including English-language Abstract.
Notice of Allowance and Search Report dated Aug. 5, 2020 in corresponding Chinese application No. 201910365394.3; 2 pages.

* cited by examiner

MOVABLE CONTROLLED ATMOSPHERE STORE FOR FRUITS AND VEGETABLES

CROSS-REFERENCE TO RELATED APPLICATIONS

This application is a national stage of International Application No. PCT/CN2019/098891, filed on Aug. 1, 2019, which claims priority to Chinese Patent Application No. 201910365394.3, filed on Apr. 30, 2019. The disclosures of the aforementioned applications are hereby incorporated by reference in their entireties.

TECHNICAL FIELD

The present disclosure relates to the field of fruit and vegetable cold storage and preservation and, in particular, to a movable controlled atmosphere store for fruits and vegetables with scientific research and experiment purposes.

BACKGROUND

Traditional fruit and vegetable storage and preservation methods include simple storage, ventilation storage, radiation preservation, chemical preservation and cold storage. The simple storage and the ventilation storage have simple equipment and low investment, but the storage effect is poor, the storage period is short and the rot loss is serious. Due to presence of radiation and chemical residual pollution, the radiation preservation and the chemical preservation are applicable to some fruits rather than all fruits and vegetables.

A controlled atmosphere store, also known as a controlled atmosphere storage, is a most advanced fruit and vegetable preservation and storage method, which adds gas composition regulation based on cold storage. By controlling temperature, humidity, carbon dioxide, oxygen concentration, ethylene concentration and other conditions in a storage environment, fruit and vegetable respiration is inhibited, and its metabolism process is delayed, so that fruit and vegetable freshness and commodity are better maintained, and a storage period and a preservation period (sales shelf life) for fruits and vegetables are extended. Generally, the controlled atmosphere storage may extend the storage period by 0.5-1 time longer than ordinary cold storage; the fruits and vegetables stored in the controlled atmosphere store may first "wake up" from a "dormancy" state after they leave the store, so that after the fruits and vegetables leave the store, the preservation period (sales shelf life) thereof is extended by 21-28 days, 3-4 times as long as that of the ordinary cold store.

Generally, the controlled atmosphere store is composed of an air-tight store body, a controlled atmosphere system, a refrigeration system, a humidification system, a pressure balancing system, as well as temperature, humidity, $O_2$, $CO_2$, and a gas automatic detection and control system. An existing controlled atmosphere store produces high-purity nitrogen through a nitrogen generator, more or less, and collaborates, after being injected with nitrogen, with deoxidization equipment to establish a controlled atmosphere environment of low oxygen. However, such controlled atmosphere store has relatively high construction and operation costs, and mostly uses a large storage space which will lead to excessively long controlled atmosphere time, unsuitable for short-term storage, especially for fruit and vegetable storage. Moreover, all existing controlled atmosphere stores are fixed devices impossible for long distance transport, which virtually reduces promotion and use of the controlled atmosphere stores.

Ethylene ($C_2H_4$) is a metabolic product of a fruit itself. Smoke from a chimney in external environment, automobile exhaust, and certain factory exhausts also contain a certain amount of ethylene. It is a plant hormone that can promote fruit respiration and accelerate ripening and aging. For fruits that are very sensitive to ethylene, such as kiwi, banana, etc., ethylene concentration under a storage condition must be removed below a threshold value, generally reaching a level of 0.02 ppm; for apples, pears and others, the controlled atmosphere storage with low ethylene is used, and the storage effect will be greatly improved. For fruits that are not sensitive to ethylene, it is not necessary to install an ethylene removal device for the controlled atmosphere storage.

At present, there are some shortcomings in small commercial movable controlled atmosphere chambers, such as inconvenient movement, inconvenient adjustment, high energy consumption and large volume. The market currently requires provision of a kind of controlled atmosphere chamber which can follow movement of a vehicle (as a carriage) and which has a simple structure and low energy consumption.

SUMMARY

With regard to the above problems, the present disclosure aims to provide a movable controlled atmosphere store for fruits and vegetables, which can realize movement and is convenient for timely storage of fruits and vegetables as well as sampling samples, and whose structure has lower cost and less energy consumption compared with a fixed controlled atmosphere store in the prior art, and can meet daily operation of preservation of fruits and vegetables, as well as storage and sampling study of fruits and vegetables in a scientific research.

To achieve the above purposes, technical schemes used in the present disclosure are:

a movable controlled atmosphere store for fruits and vegetables, including: a store body in a rectangular container structure, the store body being successively provided with an equipment room and a storage room along a length direction thereof; where the equipment room is provided with an equipment door on a side thereof; the storage room is in a thermal insulation and sealing structure, and is provided with a sealing door at an end far away from the equipment room, and the storage room is further provided with a sampling door on a side thereof; the storage room is provided with a pipe rack at the top, through which an exhaust pipe and a cold air pipe are placed, and the storage room is provided with an intake pipe on a side wall thereof; a cross section of the intake pipe is an arc-shaped structure which is formed by welding stainless steel and a side wall of the store body, and a plurality of air inlet holes are arranged on each intake pipe; the sampling door in the storage room is provided with a sealing film connected around a frame of the sampling door, and a sampling assembly connected with the sealing film, the sealing film being in a cylindrical structure; the sampling assembly includes a framework, a thermal insulation layer, an observation window, an isolation glove, a sampling grid, a support plate and a travelling wheel; the framework corresponds to a contour of the sampling door, and a contour edge of the framework corresponds to, and is sealingly attached to, an edge of an end of the sealing film; the thermal insulation layer is disposed in the framework, the observation window, the isolation glove and the sampling grid are successively disposed from top to bottom on the framework, and the travelling wheel is disposed at the bottom of the framework; the sampling grid is in a rectangular structure, and an upper end thereof is an opening, corresponding to which a cover plate that is horizontally slidable along the opening for sealing is disposed; the sampling grid is located on a side of the framework opposite to the sealing film, and is fixedly connected with the framework;

a controlled atmosphere control system, including a control panel, as well as a refrigerator, a humidifier, a sterilizer, a nitrogen generator, a carbon dioxide adsorber, an ethylene adsorber, a temperature and humidity sensor and a gas concentration sensing device that are connected with the control panel; an output end of the refrigerator is connected with the cold air pipe, and the sterilizer is an ozone sterilization device connected with the intake pipe; the nitrogen generator, the carbon dioxide adsorber and the ethylene adsorber are respectively connected with the exhaust pipe; the temperature and humidity sensor and the gas concentration sensing device are disposed on a lower end face of the pipe rack; the control panel, the refrigerator, the humidifier, the sterilizer, the nitrogen generator, the carbon dioxide adsorber, and the ethylene adsorber are disposed in the equipment room.

Preferably, the movable controlled atmosphere store for fruits and vegetables further includes a circulating pump and a pipeline regulating assembly, where the pipeline regulating assembly comprises an intake pipe air inlet assembly and an exhaust pipe air outlet assembly; the intake pipe air inlet assembly is connected with the intake pipe and a check valve is disposed at the corresponding intake pipe, and the exhaust pipe air outlet assembly is connected with the exhaust pipe and a check valve is disposed at the corresponding exhaust pipe; an air inlet end of the circulating pump is respectively connected with the carbon dioxide adsorber and the ethylene adsorber through a reversing valve, and the carbon dioxide adsorber and the ethylene adsorber are connected with the exhaust pipe air outlet assembly through a reversing valve; an air outlet end of the circulating pump is connected with the intake pipe air inlet assembly, and the air outlet end of the circulating pump is further connected with the humidifier and the sterilizer; the exhaust pipe air outlet assembly is connected with an air inlet end of the nitrogen generator through a reversing valve; the exhaust pipe air outlet assembly is connected with an air outlet end of the nitrogen generator through a reversing valve. Both the intake pipe air inlet assembly and the exhaust pipe air outlet assembly are sealed and fixed on a partition plate between the equipment room and the storage room.

Preferably, a constant pressure safety valve, an air pressure sensor and a gas balance bag, wherein the air pressure sensor is disposed on the lower end face of the pipe rack and is electrically connected with the control panel, and the constant pressure safety valve is disposed in the equipment room and connected with the equipment room; and the gas balance bag is disposed in the equipment room and connected with the equipment room.

Preferably, air inlet holes on the intake pipe that is located at the bottom of the storage room are located on both sides of the intake pipe in a vertical direction; air guide plates are further disposed within the intake pipe, and the air guide plates are disposed along a length direction of the intake pipe and is located above to central axes of the air inlet holes in parallel; and ends of the air guide plates are respectively connected with the intake pipe.

Preferably, the storage room is provided with a placing rack, a main body of which is composed of hollow pipes; the hollow pipes are mutually connected; and the placing rack is provided with plugs, which correspond to the air inlet holes on the side wall, on a side thereof.

Preferably, the store body is provided with a support frame plate at the bottom; a wall body of the store body is successively provided with a sandwich thermal insulation steel plate, a moisture-proof layer and stainless steel inner layers from outside to inside, and the wall body is 50-80 mm; and connection between the stainless steel inner layers is air-tight welding.

Preferably, the store body has a size of 3 m-6 m×1.5-2 m×1.5-2 m.

Preferably, the storage room is provided with a light and a camera device at the top, and the light and the camera device are respectively connected with a control unit.

Preferably, the control unit is further connected with a wireless communication device.

The controlled atmosphere store adds gas composition regulation. By controlling temperature, humidity, carbon dioxide, oxygen concentration, ethylene concentration and other conditions in a storage environment, food respiration is inhibited, and its metabolism process is delayed, so that food freshness and commodity are better maintained, and a storage period and a preservation period for foods are extended.

In actual operation of the controlled atmosphere store, when fruits and vegetables are put into a box, vacuum pumping is needed to isolate them from the air, and then ozone sterilization is performed, so that fruit and vegetable surfaces are further cleaned, the third step is to add nitrogen for truly complete isolation them from the air, so that the fruits and vegetables are in a total sleep state, and then regularly remove ethylene from them (remove a ripening hormone in a storage environment or a sealed package of the fruits and vegetables), after these treatments, the fruits and vegetables will be perfectly stored.

Due to adoption of the above technical schemes, the present disclosure has the following beneficial effects:

1. The present disclosure adopts a box having a compact structure and a beautiful appearance, and uses a totally enclosed refrigeration compressor having low vibration, low noise and good operation reliability. By providing the sampling assembly, samples that are placed can be sampled without opening the storage room, in this way, gas concentration imbalance is avoided, and multiple openings will increase energy consumption and cost. At the same time, the sampling assembly adopts a retractable structure, which can be adjusted as needed so that a sample is taken out, or is retractable when there is a large stock so that space cleaning is achieved.

2. The present disclosure facilitates movement, and can meet requirements of timely storage of samples in a fruit and vegetable research. For fruits and vegetables stored according to the present disclosure, original shapes, colors and fragrances of the fruits and vegetables are better preserved; fruit hardness is higher than that for ordinary cold storage; the storage time is extended; the fruits have a low decay rate and low natural loss (water loss rate); and the shelf life is extended. Since the fruits and vegetables are affected by low $O_2$ and high $CO_2$ for a long time, the fruits and vegetables will still have a long-term "lag effect" or dormancy period when a controlled atmosphere state is released; and they can be performed with long distance transportation, thus an unprocessed placing state in the prior art is avoided for the fruits and vegetables after they are picked, and accuracy of research data is improved.

BRIEF DESCRIPTION OF DRAWINGS

Exemplary descriptions are made to one or more embodiments through accompanying drawings corresponding thereto. These exemplary descriptions and the accompanying drawings do not constitute a limitation to the embodiments. Elements with same reference numerals in the accompanying drawings are shown as similar elements, and the accompanying drawings do not constitute a limitation of scale, and among them.

Figure 1:
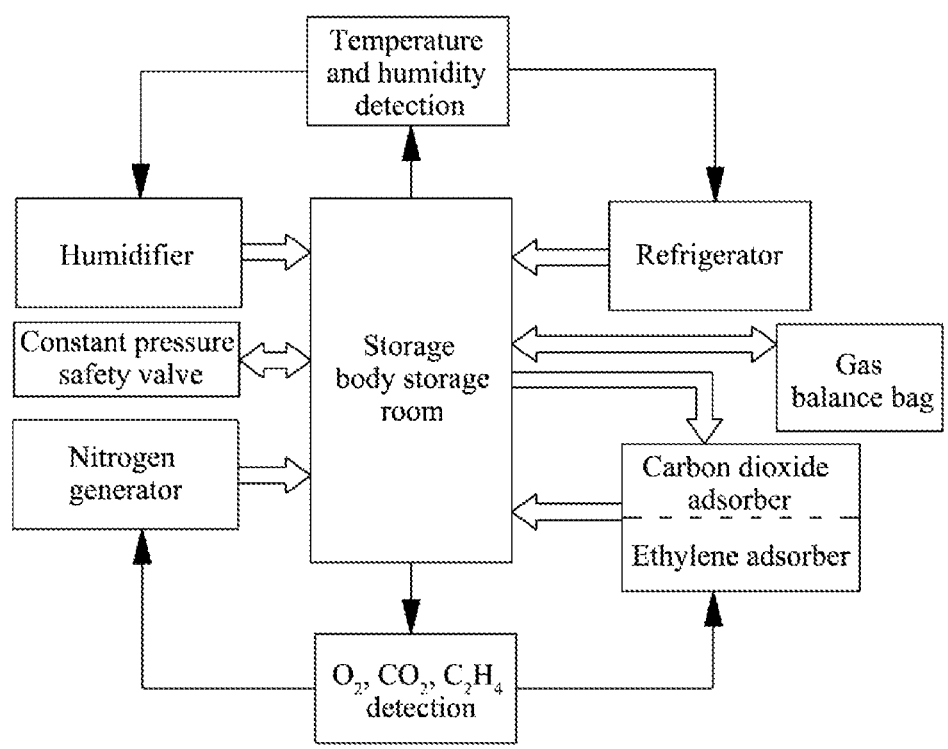
FIG. 1 is a schematic diagram of a functional framework according to the present disclosure.
Figure 2:
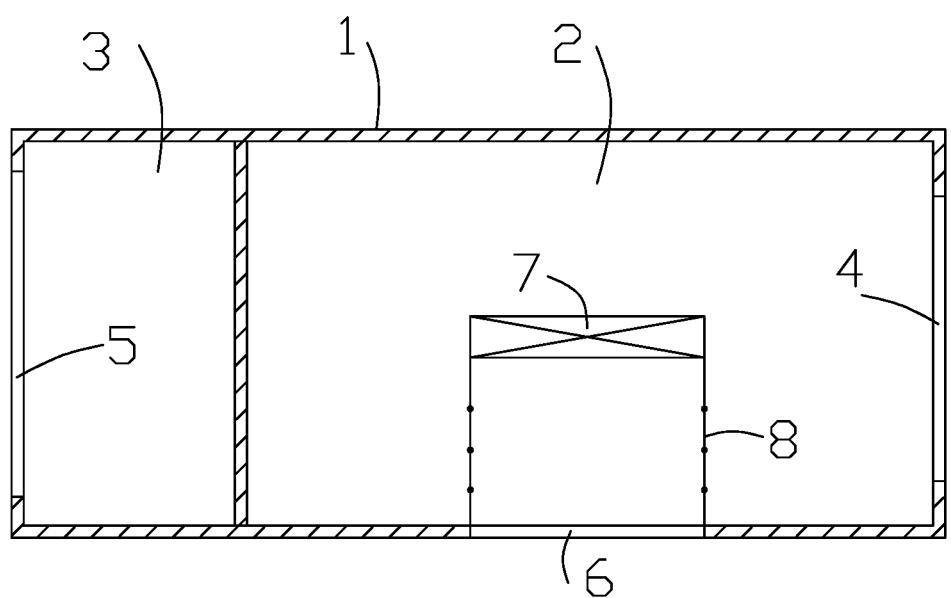
FIG. 2 is a schematic structural diagram of a store body according to the present disclosure.

In the accompanying drawings: 1-store body, 11-sandwich thermal insulation steel plate, 12-moisture-proof layer, 13-stainless steel lining, 14-pipe rack, 15-exhaust pipe, 16-intake pipe, 17-cold air pipe, 2-storage room, 3-equipment room, 4-sealing door, 5-equipment door, 6-sampling door, 7-sampling assembly, 71-framework, 72-thermal insulation layer, 73-observation window, 74-isolation glove, 75-sampling grid, 76-cover plate, 77-support plate, 78-travelling wheel, 8-sealing film.

DESCRIPTION OF EMBODIMENTS

In order to understand features and technical contents of the embodiments of the present disclosure in more details, implementations of the embodiments of the present disclosure will be described detailedly hereunder in combination with the accompanying drawings. The accompanying drawings are only for reference and illustration, but not intended to limit the embodiments of the present disclosure. In the following technical description, for the convenience of explanation, a thorough understanding of the disclosed embodiments is provided through multiple details. However, without these details, one or more embodiments can still be implemented. In other cases, for simplification of the accompanying drawings, well-known structures and devices may be demonstrated in a simplified way.

As shown in FIG. 1-FIG. 4, the present disclosure discloses a fruit and vegetable-used movable controlled atmosphere store, which is composed of a store body 1 and a controlled atmosphere control system.

Among them, the store body 1 is in a rectangular container structure, and its size is 4 m×2 m×2 m. The store body 1 is successively provided with an equipment room 3 and a storage room 2 along a length direction thereof. The equipment room 3 is provided with an equipment door 5 on a side thereof, such as on a left, or on left and right sides respectively. The storage room 2 is in a thermal insulation and sealing structure, and is provided with a sealing door 4 at an end far away from the equipment room 3, and the storage room 2 is further provided with a sampling door 6 on a side thereof. The storage room 2 is provided with a pipe rack 14 at the top, through which an exhaust pipe 15 and a cold air pipe 17 are placed, and the storage room 2 is provided with an intake pipe 16 on a side wall thereof; a cross section of the intake pipe 16 is an arc-shaped structure which is formed by welding stainless steel and a side wall of the store body 1, and several air inlet holes are arranged on each intake pipe 16. The sampling door 6 in the storage room 2 is provided with a sealing film 8 connected around a frame of the sampling door 6, and a sampling assembly 7 connected with the sealing film 8, and the sealing film 8 is in a cylindrical structure.

Figure 4:
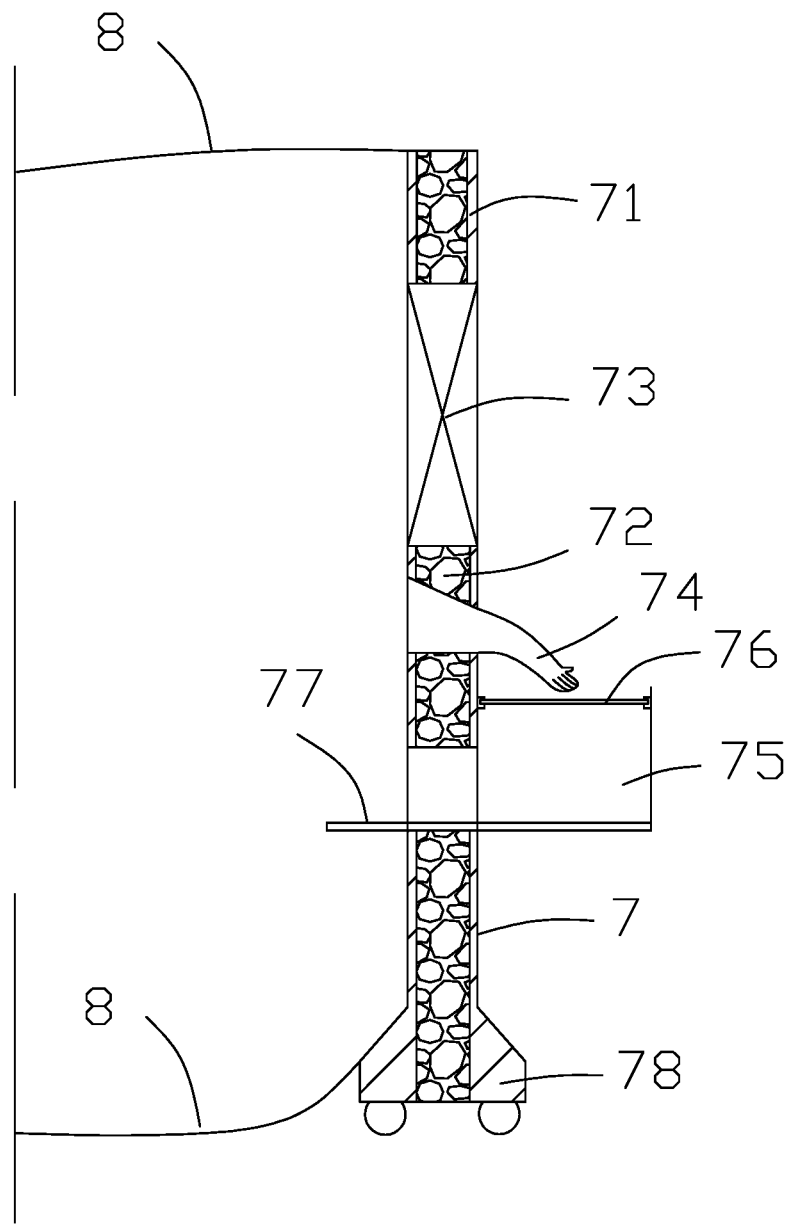
FIG. 4 is a schematic structural diagram of a sampling assembly according to the present disclosure.

As shown in FIG. 4, the sampling assembly 7 includes a framework 71, a thermal insulation layer 72, an observation window 73, an isolation glove 74, a sampling grid 75, a support plate 77 and a travelling wheel 78; the framework 71 corresponds to a contour of the sampling door 6, and a contour edge of the framework 71 corresponds to, and is sealingly attached to, an edge of an end of the sealing film 8. The thermal insulation layer 72 is disposed in the framework 71, the observation window 73, the isolation glove 74 and the sampling grid 75 are successively provided from top to bottom on the framework 71, and the travelling wheel 78 is disposed at the bottom of the framework 71; the sampling grid 75 is in a rectangular structure, an upper end thereof is an opening, corresponding to which a cover plate 76 that is horizontally slidable along the opening for sealing is disposed, the sampling grid 75 is located on a side of the framework 71 opposite to the sealing film 8, and is fixedly connected with the framework 71.

Among them, the controlled atmosphere control system includes a control panel, as well as a refrigerator, a humidifier, a sterilizer, a nitrogen generator, a carbon dioxide adsorber, an ethylene adsorber, a temperature and humidity sensor and a gas concentration sensing device that are connected with the control panel; an output end of the refrigerator is connected with the cold air pipe 17, and the sterilizer is an ozone sterilization device connected with the intake pipe 16. The nitrogen generator, the carbon dioxide adsorber and the ethylene adsorber are respectively connected with the exhaust pipe 15; the temperature and humidity sensor and the gas concentration sensing device are disposed on a lower end face of the pipe rack 14; the control panel, the refrigerator, the humidifier, the sterilizer, the nitrogen generator, the carbon dioxide adsorber, and the ethylene adsorber are disposed in the equipment room 3.

Figure 3:
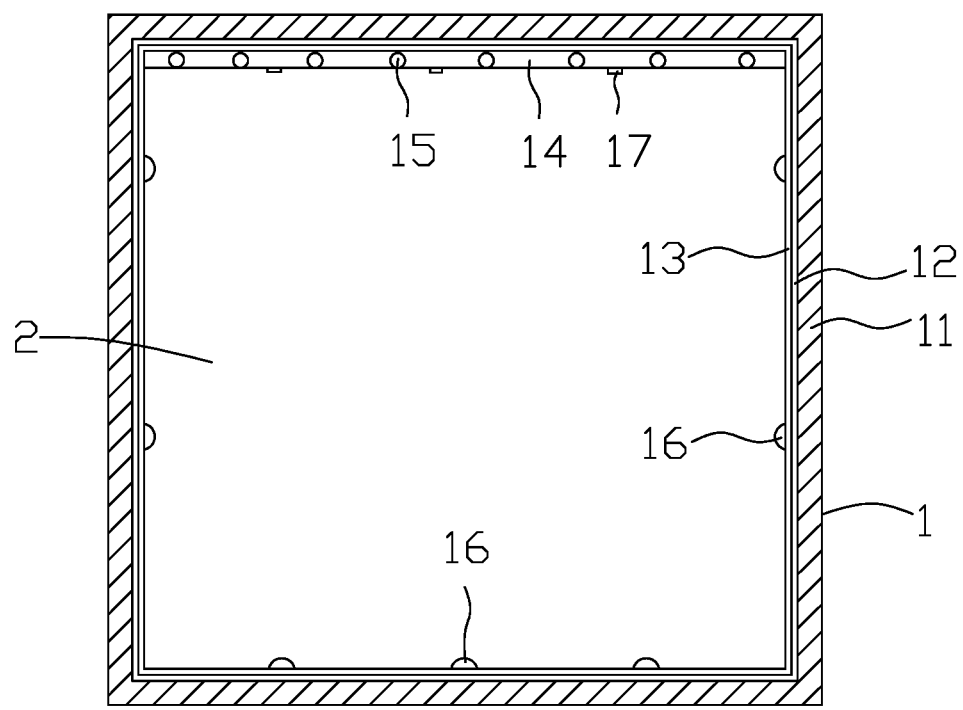
FIG. 3 is a schematic structural diagram of a cross-section of a store body according to the present disclosure.

As shown in FIG. 1 and FIG. 3, the movable controlled atmosphere store for fruits and vegetables further includes a circulating pump and a pipeline regulating assembly, where the pipeline regulating assembly includes an intake pipe 16 air inlet assembly and an exhaust pipe 15 air outlet assembly. The intake pipe 16 air inlet assembly is connected with the intake pipe 16 and a check valve is disposed at the corresponding intake pipe 16, and the exhaust pipe 15 air outlet assembly is connected with the exhaust pipe 15 and a check valve is disposed at the corresponding exhaust pipe 15. An air inlet end of the circulating pump is respectively connected with the carbon dioxide adsorber and the ethylene adsorber through a reversing valve, and the carbon dioxide adsorber and the ethylene adsorber are connected with the exhaust pipe 15 air outlet assembly through a reversing valve. An air outlet end of the circulating pump is connected with the intake pipe 16 air inlet assembly, and the air outlet end of the circulating pump is further connected with the humidifier and the sterilizer. The exhaust pipe 15 air outlet assembly is connected with an air inlet end of the nitrogen generator through a reversing valve; the exhaust pipe air outlet assembly is connected with an air outlet end of the nitrogen generator through a reversing valve. Both the intake pipe 16 air inlet assembly and the exhaust pipe 15 air outlet assembly are sealed and fixed on a partition plate between the equipment room 3 and the storage room 2.

The movable controlled atmosphere store for fruits and vegetables further includes a constant pressure safety valve, an air pressure sensor and a gas balance bag, where the air pressure sensor is disposed on the lower end face of the pipe rack 14 and is electrically connected with the control panel, and the constant pressure safety valve is disposed in the equipment room 3 and connected with the equipment room 3; and the gas balance bag is disposed in the equipment room 3 and connected with the equipment room 3.

As shown in FIG. 3, air inlet holes on the intake pipe 16 that is located at the bottom of the storage room 2 are located on both sides of the intake pipe 16 in a vertical direction. Air guide plates are further disposed within the intake pipe 16, and the air guide plates are disposed along a length direction of the intake pipe 16 and is located above to central axes of the air inlet holes in parallel; and ends of the air guide plates are respectively connected with the intake pipe 16.

As a supplement to the above schemes, the storage room 2 is provided with a placing rack, a main body of which is composed of hollow pipes, the hollow pipes are mutually connected, and the placing rack is provided with plugs, which correspond to the air inlet holes on the side wall, on a side thereof. Specifically, the store body 1 is provided with a support frame plate at its bottom, and a wall body of the store body 1 is successively provided with a sandwich thermal insulation steel plate 11, a moisture-proof layer 12 and stainless steel inner layers 13 from outside to inside, and the wall body is 50-80 mm; and connection between the stainless steel inner layers 13 is air-tight welding. Because storage requirements of some fruits and vegetables are quite different, here, through separate air-tight cabinets that are spaced apart, corresponding storage concentrations are formed. Multiple separately provided air-tight cabinets are provided at an end of the storage room 2 corresponding to the equipment room 3. The air-tight cabinets are placed in parallel with a length direction of the store body 1 through a bracket, and the air-tight cabinets are all connected with the controlled atmosphere control system. The storage room 2 is provided with a light and a camera device at the top, and the light and the camera device are respectively connected with a control unit. The control unit is also connected with a wireless communication device to facilitate wireless connection and control.

The above description is a detailed description of preferred and feasible embodiments of the present disclosure, but the embodiments are not used to limit the scope of the patent application of the present disclosure. Any equivalent variations or modification changes finished under the technical spirit indicated by the present disclosure should belong to the scope of the patent covered by the present disclosure. In addition, terms are used in the above technical description to provide a thorough understanding of the described embodiments. However, too detailed details are not required to implement the described embodiments. Therefore, the above description of the embodiments is presented for interpretation and description. The embodiments presented in the above description and examples disclosed according to these embodiments are provided separately to add context and facilitate understanding of the described embodiments. The above description is not intended to be exhaustive or to limit the described embodiments to a precise form of the present disclosure. According to the above teaching, several modifications, selective applications and changes are feasible. In some cases, a well-known processing step is not described in detail to avoid an unnecessary influence on the described embodiments.

The invention claimed is:

1. A movable controlled atmosphere store for fruits and vegetables, comprising: a store body in a rectangular container structure, the store body being successively provided with an equipment room and a storage room along a length direction thereof; wherein the equipment room is provided with an equipment door on a side thereof; the storage room is in a thermal insulation and sealing structure, and is provided with a sealing door at an end far away from the equipment room, and the storage room is further provided with a sampling door on a side thereof; the storage room is provided with a pipe rack at the top, through which an exhaust pipe and a cold air pipe are placed, and the storage room is provided with an intake pipe on a side wall thereof; a cross section of the intake pipe is an arc-shaped structure which is formed by welding stainless steel and a side wall of the store body, and a plurality of air inlet holes are arranged on each intake pipe; the sampling door in the storage room is provided with a sealing film connected around a frame of the sampling door, and a sampling assembly connected with the sealing film, the sealing film being in a cylindrical structure; the sampling assembly comprises a framework, a thermal insulation layer, an observation window, an isolation glove, a sampling grid, a support plate and a travelling wheel; the framework corresponds to a contour of the sampling door, and a contour edge of the framework corresponds to, and is sealingly attached to, an edge of an end of the sealing film; the thermal insulation layer is disposed in the framework, the observation window, the isolation glove and the sampling grid are successively disposed from top to bottom on the framework, and the travelling wheel is disposed at the bottom of the framework; the sampling grid is in a rectangular structure, and an upper end thereof is an opening, corresponding to which a cover plate that is horizontally slidable along the opening for sealing is disposed; the sampling grid is located on a side of the framework opposite to the sealing film, and is fixedly connected with the framework;

a controlled atmosphere control system, comprising a control panel, as well as a refrigerator, a humidifier, a sterilizer, a nitrogen generator, a carbon dioxide adsorber, an ethylene adsorber, a temperature and humidity sensor and a gas concentration sensing device that are connected with the control panel; an output end of the refrigerator is connected with the cold air pipe, and the sterilizer is an ozone sterilization device connected with the intake pipe; the nitrogen generator, the carbon dioxide adsorber and the ethylene adsorber are respectively connected with the exhaust pipe; the temperature and humidity sensor and the gas concentration sensing device are disposed on a lower end face of the pipe rack; the control panel, the refrigerator, the humidifier, the sterilizer, the nitrogen generator, the carbon dioxide adsorber, and the ethylene adsorber are disposed in the equipment room.

2. The movable controlled atmosphere store for fruits and vegetables according to claim 1, further comprising a circulating pump and a pipeline regulating assembly, wherein the pipeline regulating assembly comprises an intake pipe air inlet assembly and an exhaust pipe air outlet assembly; the intake pipe air inlet assembly is connected with the intake pipe and a check valve is disposed at the corresponding intake pipe, and the exhaust pipe air outlet assembly is connected with the exhaust pipe and a check valve is disposed at the corresponding exhaust pipe; an air inlet end of the circulating pump is respectively connected with the carbon dioxide adsorber and the ethylene adsorber through a reversing valve, and the carbon dioxide adsorber and the ethylene adsorber are connected with the exhaust pipe air outlet assembly through a reversing valve; an air outlet end of the circulating pump is connected with the intake pipe air inlet assembly, and the air outlet end of the circulating pump is further connected with the humidifier and the sterilizer; the exhaust pipe air outlet assembly is connected with an air inlet end of the nitrogen generator through a reversing valve; the exhaust pipe air outlet assembly is connected with an air outlet end of the nitrogen generator through a reversing valve; both the intake pipe air inlet assembly and the exhaust pipe air outlet assembly are sealed and fixed on a partition plate between the equipment room and the storage room.

3. The movable controlled atmosphere store for fruits and vegetables according to claim 1, further comprising a constant pressure safety valve, an air pressure sensor and a gas balance bag, wherein the air pressure sensor is disposed on the lower end face of the pipe rack and is electrically connected with the control panel, and the constant pressure safety valve is disposed in the equipment room and connected with the equipment room; and the gas balance bag is disposed in the equipment room and connected with the equipment room.

4. The movable controlled atmosphere store for fruits and vegetables according to claim 1, wherein air inlet holes on the intake pipe that is located at the bottom of the storage room are located on both sides of the intake pipe in a vertical direction; air guide plates are further disposed within the intake pipe, and the air guide plates are disposed along a length direction of the intake pipe and is located above to central axes of the air inlet holes in parallel; and ends of the air guide plates are respectively connected with the intake pipe.

5. The movable controlled atmosphere store for fruits and vegetables according to claim 1, wherein the storage room is provided with a placing rack, a main body of which is composed of hollow pipes; the hollow pipes are mutually connected; and the placing rack is provided with plugs, which correspond to the air inlet holes on the side wall, on a side thereof.

6. The movable controlled atmosphere store for fruits and vegetables according to claim 1, wherein the store body is provided with a support frame plate at the bottom; a wall body of the store body is successively provided with a sandwich thermal insulation steel plate, a moisture-proof layer and stainless steel inner layers from outside to inside, and the wall body is 50-80 mm; and connection between the stainless steel inner layers is air-tight welding.

7. The movable controlled atmosphere store for fruits and vegetables according to claim 1, wherein the store body has a size of 3-6 m×1.5-2 m×1.5-2 m.

8. The movable controlled atmosphere store for fruits and vegetables according to claim 1, wherein the storage room is provided with a light and a camera device at the top, and the light and the camera device are respectively connected with a control unit.

9. The movable controlled atmosphere store for fruits and vegetables according to claim 1, wherein the control unit is further connected with a wireless communication device.

\* \* \* \* \*